(12) United States Patent
Jong et al.

(10) Patent No.: US 11,606,779 B2
(45) Date of Patent: Mar. 14, 2023

(54) INTERNET-OF THINGS NARROWBAND COMMUNICATIONS WITH MOBILE SATELLITE

(71) Applicants: James Jehong Jong, North Potomac, MD (US); Channasandra Ravishankar, Clarksburg, MD (US); William Whitmarsh, Germantown, MD (US)

(72) Inventors: James Jehong Jong, North Potomac, MD (US); Channasandra Ravishankar, Clarksburg, MD (US); William Whitmarsh, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 175 days.

(21) Appl. No.: 17/325,289

(22) Filed: May 20, 2021

(65) Prior Publication Data
US 2021/0368478 A1  Nov. 25, 2021

Related U.S. Application Data

(60) Provisional application No. 63/028,931, filed on May 22, 2020.

(51) Int. Cl.
*H04W 72/02* (2009.01)
*H04L 27/26* (2006.01)
(Continued)

(52) U.S. Cl.
CPC ......... *H04W 72/02* (2013.01); *H04L 27/2614* (2013.01); *H04W 52/0229* (2013.01);
(Continued)

(58) Field of Classification Search
CPC ............ H04W 72/02; H04W 52/0229; H04W 56/001; H04W 72/0446; H04W 72/14;
(Continued)

(56) References Cited

U.S. PATENT DOCUMENTS 5,303,234 A * 4/1994 Kou ...................... H04L 1/1874
                                                      370/442
2021/0143903 A1* 5/2021 Parr .................. H04W 52/0235

OTHER PUBLICATIONS

Ferrer Tomas et al: "Review and Evaluation of MAC Protocols for Satellite IoT Systems Using Nanosatellites", SENSORS, vol. 19, No. 8, Apr. 25, 2019 (Apr. 25, 2019), p. 1947, XP055843349, DOI: 10.3390/s19081947.

(Continued)

*Primary Examiner* — Chae S Lee
(74) *Attorney, Agent, or Firm* — Capitol City TechLaw; Jasbir Singh

(57) ABSTRACT

A system and method for communicating with an Internet Of Things (IoT) device via a satellite link. The method includes assigning a transmission mode to a physical channel, where the physical channel supports multiple timeslot durations and the transmission mode is selected from a single user (SU) or a multi-user (MU); selecting a timeslot duration from the multiple durations for a payload; obtaining, when the transmission mode is SU, a timeslot grant for use of the physical channel for the timeslot duration; and transmitting a burst including the payload, where the burst is transmitted synchronized with the timeslot grant when the transmission mode is SU and the burst is transmitted without synchronization when the transmission mode is MU.

20 Claims, 6 Drawing Sheets

(51) Int. Cl.
    *H04W 52/02*     (2009.01)
    *H04W 56/00*     (2009.01)
    *H04W 72/04*     (2009.01)
    *H04W 72/14*     (2009.01)
    *H04W 72/0446*   (2023.01)

(52) U.S. Cl.
    CPC ..... *H04W 56/001* (2013.01); *H04W 72/0446* (2013.01); *H04W 72/14* (2013.01)

(58) Field of Classification Search
    CPC ............ H04L 27/2614; H04B 7/18532; H04B 7/18515
    See application file for complete search history.

(56) References Cited

OTHER PUBLICATIONS

Fraire Juan A et al: "Direct-To-Satellite IoT—A Survey of the State of the Art and Future Research Perspectives", Sep. 25, 2019 (Sep. 25, 2019), Advances in Intelligent Data Analysis XIX; [Lecture Notes in Computer Science; Lect. Notes Computer], Springer International Publishing, CHAM, pp. 241-258, XP047557500, ISSN: 0302-9743ISBN: 978-3-540-35470-3 [retrieved on Sep. 25, 2019].
International Search Report for PCT Application No. PCTUS2021/033292.
P. Fines, A. Khan, P. Febvre, "Helicopter Propagation Effects and Countermeasures for Reliable Bandwidth Efficient Communications via Satellite," ICSSC 2013.
P. Fines, E. Christofylaki, H. Aghvami, "Bandwidth efficient techniques for helicopter links via satellite," IEEE International Symposium on PIMRC, 2013.

* cited by examiner

| Burst Format | Tx Rate in ksps | Burst Duration in ms | # of syms in a burst | Guard Symbols | UWCW symbols | Modulation | # of Coded Bits after rate matching | Spreading/ Repetition | Coded bits before Spreading/ Repetition | FEC rate | FEC type | Payload Info. (incl CRC bits) | Peak Payload Data Rate in kbps |
|---|---|---|---|---|---|---|---|---|---|---|---|---|---|
| NFCCH (0.25, 48) | 5.85 | 80 | 468 | 0 | 468 | Dual-Chirp | | | | N/A | | | |
| NPNB (0.25, 96) | 5.85 | 160 | 936 | 0 | 160 | π/2-BPSK | 776 | 2 | 388 | 0.31 | Conv. | 120 | 0.75 |
| FCCH3 (1,12) | 23.4 | 20 | 468 | 0 | 468 | Dual-Chirp | | | | N/A | | | |
| PNB (1,48) | 23.4 | 80 | 1872 | 0 | 144 | π/2-BPSK | 1728 | 2 | 864 | 0.31 | Conv./ Turbo | 272 | 3.4 |
| PNB (5,12) | 117 | 20 | 2340 | 5 | 133 | π/2-BPSK | 2202 | 2 | 1101 | 0.33 | Turbo | 360 | 18.00 |

FIG. 2

| Burst Format | Tx Rate in ksps | Burst Duration in ms | # of syms in a burst | Guard Symbols | UWCW symbols | Modulation | # of Coded Bits after rate matching | Spreading/ Repetition | Coded bits before Spreading/ Repetition | FEC rate | FEC type | Payload Info. (incl CRC bits) | Peak Payload Data Rate in kbps |
|---|---|---|---|---|---|---|---|---|---|---|---|---|---|
| NPNB (0.25, 576) | 5.85 | 960 | 5616 | 146 | 1602 | π/2-BPSK | 3868 | 4 | 967 | 0.34 | Turbo | 328 | 0.34 |
| NPNB* (0.25, 288) | 5.85 | 480 | 2808 | 146 | 1402 | π/2-BPSK | 1260 | 4 | 315 | 0.25 | Conv./ Turbo | 80 | 0.17 |
| PNB (1,144) | 23.4 | 240 | 5616 | 146 | 1602 | π/2-BPSK | 3868 | 4 | 967 | 0.34 | Turbo | 328 | 1.37 |
| PNB* (1,72) | 23.4 | 120 | 2808 | 146 | 1402 | π/2-BPSK | 1260 | 4 | 315 | 0.25 | Conv./ Turbo | 80 | 0.67 |

FIG. 3

| Day Usage | Without Deep Sleep | | | With Deep Sleep | | |
|---|---|---|---|---|---|---|
| | mw | seconds | mWh | mw | seconds | mWh |
| Tx | 500 | 5 | 0.7 | 500 | 5 | 0.7 |
| Rx-active | 1000 | 24 | 6.7 | 1000 | 24 | 6.7 |
| Rx-sleep (dormant) | 25 | 86376 | 599.8 | 25 | 216 | 1.5 |
| Rx-Deep sleep (deep sleep)) | NA | NA | NA | 0.15 | 86160 | 3.6 |
| Total usage per day | | | 607.2 | | | 12.5 |

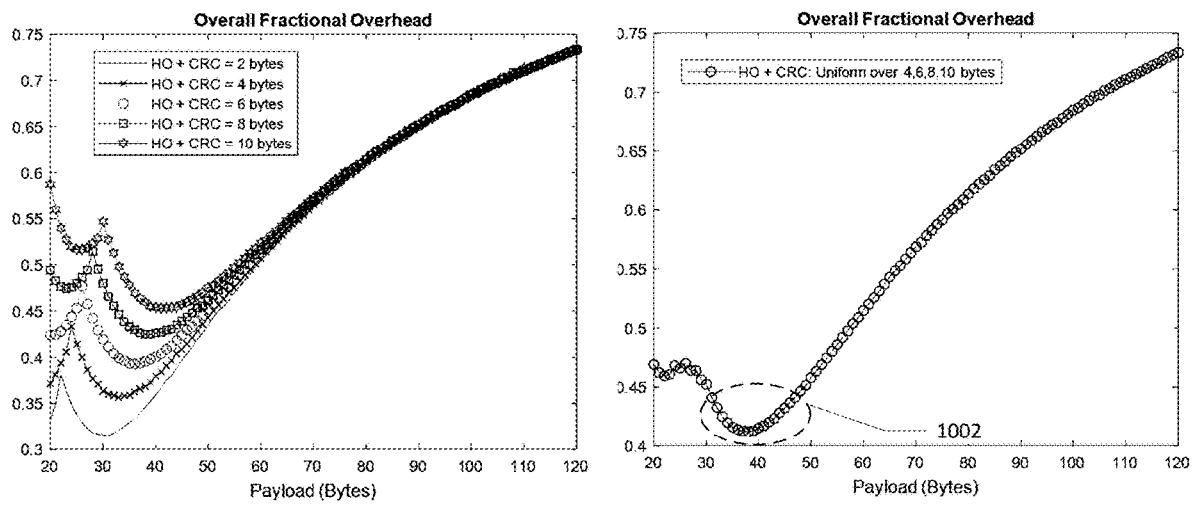

```
┌─────────────────────────────────────────────────────────────────────────┐
│ Assign a transmission mode to a bearer, wherein the bearer supports bursts of multiple │
│ timeslot durations and the transmission mode is selected from SU or MU 1102 │
└─────────────────────────────────────────────────────────────────────────┘
                                    ↓
┌─────────────────────────────────────────────────────────────────────────┐
│ Calculate an optimal payload size based on optimizing a burst utilization 1104 │
└─────────────────────────────────────────────────────────────────────────┘
                                    ↓
┌─────────────────────────────────────────────────────────────────────────┐
│ Select a time slot duration from the multiple timeslot durations for a payload 1106 │
└─────────────────────────────────────────────────────────────────────────┘
                                    ↓
┌─────────────────────────────────────────────────────────────────────────┐
│ Segment the payload, prior to the transmitting, based on the optimal payload size 1108 │
└─────────────────────────────────────────────────────────────────────────┘
                                    ↓
┌─────────────────────────────────────────────────────────────────────────┐
│ Obtain, when the transmission mode is SU, a time slot grant for use of the bearer for │
│                        the time slot duration 1110 │
└─────────────────────────────────────────────────────────────────────────┘
                                    ↓
┌─────────────────────────────────────────────────────────────────────────┐
│ Transmit a burst including the payload, wherein the burst is transmitted synchronized │
│ with the time slot grant when the transmission mode is SU and the burst is transmitted │
│           without synchronization when the transmission mode is MU 1112 │
└─────────────────────────────────────────────────────────────────────────┘
                                    ↓
┌─────────────────────────────────────────────────────────────────────────┐
│                        Receive the burst 1114 │
└─────────────────────────────────────────────────────────────────────────┘
                                    ↓
┌─────────────────────────────────────────────────────────────────────────┐
│ Place the IOT device in a connected mode, an idle mode or a power saving mode, │
│ wherein a power consumption rate of the power saving mode is less than both a power │
│ consumption rate of the idle mode and a power consumption rate of the connected │
│                               mode 1116 │
└─────────────────────────────────────────────────────────────────────────┘
```

FIG. 11

INTERNET-OF THINGS NARROWBAND COMMUNICATIONS WITH MOBILE SATELLITE

CROSS-REFERENCE TO RELATED APPLICATIONS AND INCORPORATION BY REFERENCE

The present application claims the benefit under 35 U.S.C. 119(e) of U.S. Provisional Application Ser. No. 63/028,931, filed May 22, 2020, which is incorporated herein by reference in its entirety.

FIELD

A system and method for narrowband Internet of Things (IoT) services with a waveform, a baseband processing of a terminal transmitter and a Radio Access Network (RAN). The present teachings support sub-band channelization to enable easy migration of existing mobile satellite into next generation system with, for example, multiple tier IoT services.

BACKGROUND

In a conventional communication system, rate matching or multiple code points or multiple burst types can be used to carry many different message sizes. For an IoT application, however, the support of variable message size imposes complexity for terminal as well as gateway implementation. A small number of different sizes for the message or even one size for the message is preferred for massive low cost IoT device development. Typical IoT message size being small, any overhead such as upper layer header and CRC portion significantly affect the overall utilization efficiency of the burst. To make the situation more challenging, although absolute size of the IoT message is smaller than conventional data communication, the message size can vary depending on a type of IoT services.

There is also a need for satellite NB-IoT devices to use less power.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for communicating with an Internet Of Things (IoT) device via a satellite link. The method includes assigning a transmission mode to a physical channel, where the physical channel supports multiple timeslot durations and the transmission mode is selected from a single user (SU) or a multi-user (MU); selecting a timeslot duration from the multiple durations for a payload; obtaining, when the transmission mode is SU, a timeslot grant for use of the physical channel for the timeslot duration; and transmitting a burst including the payload, where the burst is transmitted synchronized with the timeslot grant when the transmission mode is SU and the burst is transmitted without synchronization when the transmission mode is MU. Other embodiments of this aspect include corresponding computer systems, apparatus, and computer programs recorded on one or more computer storage devices, each configured to perform the actions of the methods.

Implementations may include one or more of the following features. The method where the transmitting uses an instantaneous effective isotropically radiated power (EIRP) that is less than −3.5 dBW for closing a link on the physical channel with a receiver. The method where the physical channel supports multiple symbol rates and each of the multiple symbol rates has a low peak to average power ratio (PAPR). The method may include calculating an optimal payload size based on optimizing a burst utilization; and segmenting the payload, prior to the transmitting, based on the optimal payload size.

The method may include placing the IoT device in a connected mode, an idle mode, or a power saving mode, wherein a power consumption rate of the power saving mode is less than both a power consumption rate of the idle mode and a power consumption rate of the connected mode. The connected mode may include a transmitting duration consuming a transmitting power, a receiving duration consuming a receiving power and a dormant duration consuming a dormant power, where the dormant power is less than both the transmitting power and the receiving power.

The method may include receiving, with a multiuser receiver, the burst when the transmission mode is MU. The transmitting may include repeating a burst, where the receiving performs selection combining on the repeated bursts when the transmission mode is MU, and the receiving performs maximum-ratio combining (MRC) on the repeated bursts when the transmission mode is SU. The method may include aggregating a plurality of basebands to define the baseband of the physical channel. The method may include dividing a baseband of the physical channel into sub-bands, where the transmission mode of each of the sub-bands is set independently. Implementations of the described techniques may include hardware, a method or process, or computer software on a computer-accessible medium.

One general aspect includes a system to communicate with an Internet of Things (IoT) device via a satellite link. The system may include a physical channel that is assigned a transmission mode, where the physical channel supports multiple timeslot durations and the transmission mode is selected from a single user (SU) or a multi-user (MU); and a transmitter: to select a timeslot duration from the multiple timeslot durations for a payload, to obtain, when the transmission mode is SU, a timeslot grant for use of the physical channel for the timeslot duration, and to transmit a burst may include the payload, where the burst is transmitted synchronized with the timeslot grant when the transmission mode is SU and the burst is transmitted without synchronization when the transmission mode is MU. Other embodiments of this aspect include corresponding computer systems, apparatus, and computer programs recorded on one or more computer storage devices, each configured to perform the actions of the methods.

Additional features will be set forth in the description that follows, and in part will be apparent from the description, or may be learned by practice of what is described.

DRAWINGS

In order to describe the way, the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail using the accompanying drawings.

FIG. 2 illustrates some key attributes of the ¼x, 1x and 5x forward physical channels according to various embodiments.

FIG. 3 illustrates some key attributes of the ¼x and 1x return physical channels according to various embodiments.

FIG. 10C illustrates fractional overheads for various HO+CRC and filler sizes according to various embodiments.

FIG. 10D illustrates an overall fractional overhead according to various embodiments.

FIG. 11 illustrates a method for communicating with an IoT device via a satellite link according to various embodiments.

Figure 1A:
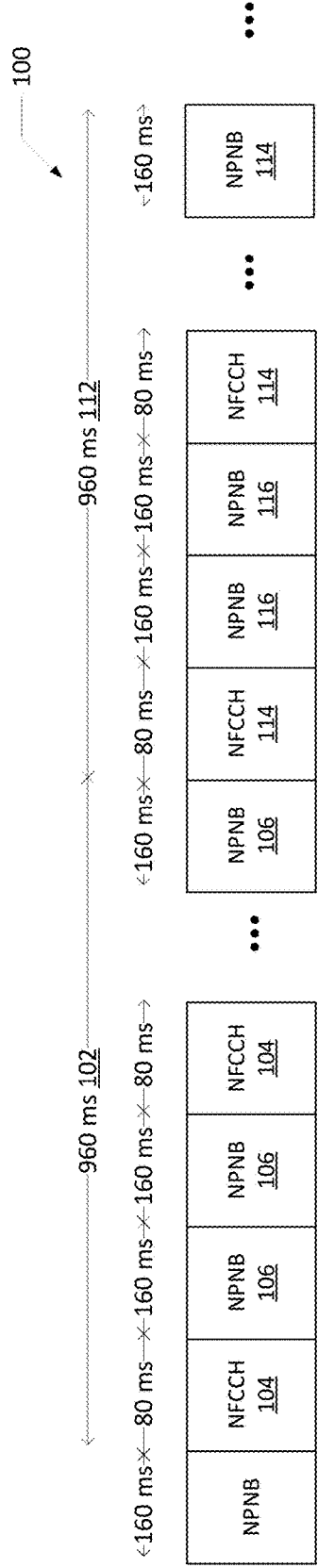
FIG. 1A illustrates a ¼x physical channel according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

INTRODUCTION

Internet of Things (IoT) networks support massive number of low throughput devices. The present teachings leverage the Geo-Mobile Radio (GMR) standards laid out in GMR-1 3G/4G framework and advanced technology. The improvements allow for minimizing duty cycle/power at low data rates while supporting massive connections. This enables low cost IoT terminal development for use with satellites. A low cost and scalable Radio Access Network (RAN) is disclosed. With the present teachings an existing satellite operator may enable low-cost augmentation of a satellite network to support IoT terminals thus providing a cost efficient integrated terrestrial and satellite network. Value added service via an integrated Mobile Satellite Services (MSS) IoT solution. As such, traditional MSS services plus new satellite IoT services may be offered.

The present teachings provide a flexible air interface numerology based on GMR-1 with sub-band channelization for easy migration of existing mobile satellite into a next generation system with IoT services with multiple tier IoT services. The present teaching support multiple set of symbol rates (bandwidth) and timeslot durations. A set of symbol rate and timeslot duration may be used for the traditional MSS services (non-IoT). Use of this set of symbol rate and timeslot duration may help introducing new terminals with traditional MSS services as well as IoT.

The multi-mode transmission provides reliable IoT transmission over a satellite link for a single user or multiple users. In some embodiments, multiple transmissions may be sent to improve reliability. Two different modes for may be supported: selection combining for multi-user (MU) mode and MRC combining for single user mode. The different modes minimize the gateway development cost and improve cost efficiency.

The present teachings are resource efficient and prevent spectrum fragmentation and maximize system spectrum utilization. In some embodiments, frequency-time resource sharing is provided to maximize the system throughput. Multiple sets of symbol rates (bandwidth) and timeslot durations are supported. This includes the set of symbol rate and timeslot duration used for the traditional MSS services (non-IoT). By including the MSS set of symbol rate and timeslot duration resistance to new terminals is reduced. In some embodiments, the present teachings enable simultaneous transmission of multiple user message over the same time and frequency resource.

Simple and effective coupled with ease of implementation provides for a low-cost terminal. Complexity may be moved to the gateway to provide an attractive solution for IoT devices having low-weight small-formfactor devices aimed for massive production. In some embodiments, a low-cost terminal may support only one set with the smallest symbol rates.

The present teachings use ¼x, 1x or 5x symbol rate physical channels for a link, where x is a baseband. In GMR-1, 1x denotes a burst symbol rate of 23.4 ksps and a channel bandwidth of 31.25 kHz. Under this convention, 0.25x denotes dividing a 1x baseband physical channel into 4¼ sub-band physical channels having a burst symbol rate of 5.85 ksps and a channel bandwidth of 7.8125 kHz. 5x denotes aggregating five 1x baseband physical channels into 1 5x physical channel having a burst symbol rate of 117 ksps and a channel bandwidth of 156.25 kHz. In some embodiments, the aggregated baseband physical channels of the 5x physical channel may include 5 contiguous basebands. In some embodiments, the aggregated baseband physical channels of the 5x physical channel may include 5 non-contiguous basebands.

Forward Link

The present teachings use ¼x, 1x or 5x symbol rate bearer/physical channels for a forward link. IoT traffic may be conveyed with two types of physical channels: Frequency Correction Channel and Packet Normal Bursts. When a new symbol rate of ¼x may be used, the FCCH and PNB may be prefixed with an "N", i.e., NFCCH and NPNB. The forward link physical channel may support Discontinuation Reception (DRX) and a deep sleep mode to conserve a User Terminal battery life. The PNB may include a Cyclic Redundancy Check (CRC) as an error-detecting code.

Figure 1B:
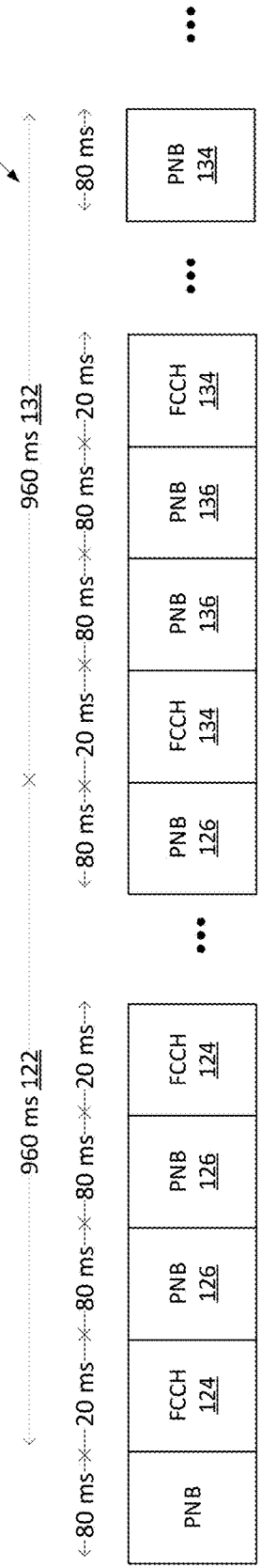
FIG. 1B illustrates a 1x physical channel according to various embodiments.
Figure 1C:
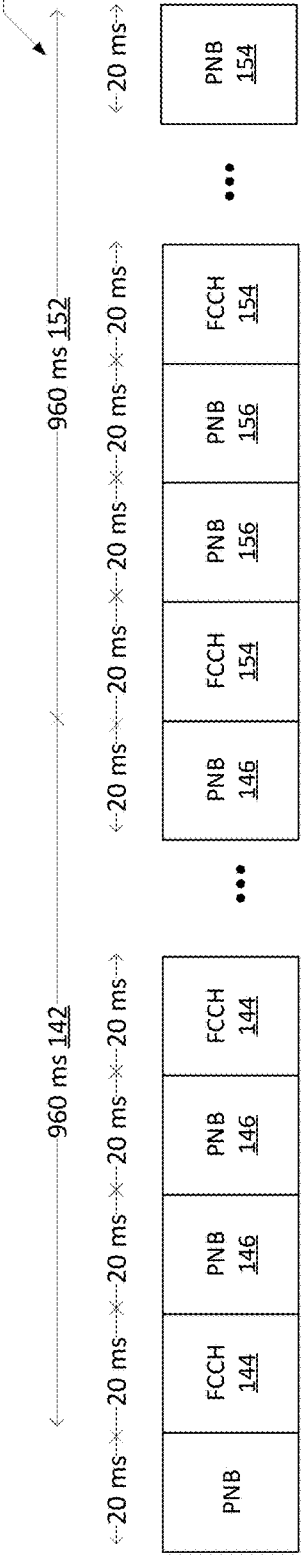
FIG. 1C illustrates a 5x physical channel according to various embodiments.

The FCCH is a chirp signal used for acquisition and synchronization. The FCCH/NFCCH may be 80 ms long at ¼x (FIG. 1A, NFCCH 104, 114), 20 ms long at 1x (same as existing 20 ms FCCH 3; FIG. 1B, FCCH 124, 134), and not transmitted over 5x. Terminal may acquire FCCH on either 1x or 0.25x. FIG. 1C illustrates an FCCH 144, 154 that is 20 ms long and acquired via the 1x signal.

The PNB/NPNB carries data and control messages. At ¼x, the PNB may be 160 ms long and include 15 bytes (including a 2-byte CRC; FIG. 1A, NPNB 106, 116). At 1x, the PNB may be 80 ms long and include 34 bytes (including a 2-byte CRC; FIG. 1B PNB 126, 136). At 5x, the PNB may be 20 ms long and include 45 bytes (including 2-byte CRC; FIG. 1C, PNB 146, 156). For a PNB, the Frame Error Rate (FER) of less than or equal to 1% at [−4] decibels in Additive White Gaussian Noise (AWGN).

The FCCHs and PNBs may be used to form a physical channel segmented into superframes. The superframes may be in 960 ms in length. In some embodiments, the first and optionally second PNB(s) of each superframe may be used to carry system information, an Uplink Map (ULMAP), a Downlink (DLMAP), in addition to user/control data.

FIG. 1A illustrates a ¼x physical channel according to various embodiments.

In FIG. 1A, a ¼x physical channel 100 includes superframes 102, 112 of 960 ms each. A transmission of the superframes 102, 112 may be a contiguous signal in the ¼x physical channel 100. In the physical channel 100, each of the superframes 102, 112 may include 2×80 ms NFCCHs and 5×160 ms NPNBs. 0.25x permits a whole system using 1x (31.25 kHz) BW using a reuse factor of 4.

FIG. 1B illustrates a 1x physical channel according to various embodiments.

In FIG. 1B, a 1x physical channel 120 includes superframes 122, 132 of 960 ms each. A transmission of the superframes 122, 132 may be a contiguous signal in the physical channel 120. In the 1x physical channel 120, each of the superframes 122, 122 may include 4×20 ms FCCHs and 11×80 ms PNBs. 1x minimizes terminal receive on time compared to 0.25x and may prolong battery life.

FIG. 1C illustrates a 5x physical channel according to various embodiments.

In FIG. 1C, a 5x physical channel 140 includes superframes 142, 152 of 960 ms each. A transmission of the superframes 142, 152 may be a contiguous signal in the 5x physical channel 140. In the 5x physical channel 140, each of the superframes 142, 152 may include 48×20 ms PNBs. FCCHs for use with a the 5x physical channel 140 may be acquired from a 1x physical channel interspersing 4×20 ms FCCHs in each of the superframes 142, 152. 5x allows a transport of bigger size packet in a power efficient manner.

FIG. 2 illustrates some key attributes of the ¼x, 1x and 5x forward physical channels according to various embodiments.

A table 200 illustrates some key attributes of the ¼x, 1x and 5x forward physical channels. As seen in table 2, a PNB(1,48) may have two types Forward Error Correction (FEC): FEC with conventional encoding and FEC with Turbo encoding. NPNB(0.25,96) includes only conventional encoding to support low-cost terminals with less processing power. The 5x Operation assumes a UT acquiring a normal CCCH for system information and initial synchronization.

Return Link

The present teachings disclose two types of physical channel that may be used for a link: ¼x based narrow band IoT physical channel and 1x based IoT physical channel. The type of physical channel selected depends on available carrier bandwidth. The 0.25x physical channel enables highly reliable link with IoT devices and minimizes required instantaneous Effective Isotropically Radiated Power (EIRP) as low as −5 dBW for a link closure. In some embodiments, the EIRP is less than −3 dBW, less than −3.5 dBW, less than −4 dBW or the like. The 1x physical channel with a shorter timeslot duration minimizes overall service delay. In some embodiments, a $\pi/2$-BPSK modulation with a low PAPR provides for higher amplifier efficiency, i.e., higher link margin. A return link may enable one shot random access with a payload as big as 41 bytes; for NB-IoT this can minimize conventional two phased transmission (random Access followed by data session). The return link can enable multiple user detection (MUD) at RAN to support massive connections. In some embodiments, a hybrid mode of multi and single user receptions may be provided to allow a balance between efficient bandwidth utilization and link performance.

An NPNB carries data and control messages in these physical channels. The present teachings provide for up to two burst lengths for each of the 0.25x and 1x physical channels. As a baseline, a 0.25x physical channel may transport 41 bytes including 2-byte CRCs in 960 ms, while a 1x physical channel may need 240 ms to transport the same number of bytes. In some embodiments, shorter messages of only 10 bytes (1-byte CRC) may be transported in 480 ms by a ¼x channel and in 120 ms by a 1x channel. Some burst types may be optimized for a packet size of less than or equal to 10 bytes, for example, initial access, resource request, ACK/NACK. High timing and frequency uncertainty burst types may be optimized for a packet size of less than or equal to 10 bytes. In some embodiments, the transmissions may be synchronous with a frame start clock. In other embodiments, the transmissions may be synchronous with a symbol start clock.

The present teachings support Time Division Multiple Access (TDMA) with Multiple User Detection (MUD). In some embodiments, up to 4~5 simultaneous users per 0.25x physical channel may be supported assuming that each of the simultaneous users transmit a 41-byte message over 0.96 sec. With this assumption, the present teachings may transmit more than 6000 messages/min over a 156.25 kHz band (i.e., over 8.6 million messages/day over 156.25 kHz). The present teachings support consecutive multiple transmissions. One or more of the multiple transmissions may be a repetitive transmission.

FIG. 3 illustrates some key attributes of the ¼x and 1x return physical channels according to various embodiments.

A table 300 illustrates some key attributes of the ¼x and 1x return physical channels. As seen in table 300, a NPNB (0.25,288) and PNB(1,72) may have two types of FEC: FEC with convolutional encoding and FEC with Turbo encoding. The FEC with only conventional encoding supports low-cost terminals with less processing power.

A Return guard period may be set around +/−12.5 ms for GEO environment over a wide beam and may be used in conjunction with a synchronization design. One-shot transmission may be supported using a 240 ms or 960 ms burst to carry a message 41-bytes (including 2-byte CRC). The 41-byte message minimizes segmentation of a message and hence reduces transmit on time and receive on time for waiting acknowledgement. The 120 ms, 480 ms burst may be used for a small packet size 10 bytes (such as initial access, resource request, ACK/NACK, or the like) and high timing and frequency uncertainty.

Figure 4:
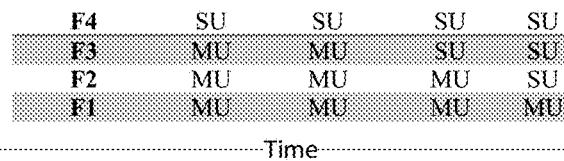
FIG. 4 illustrates transmission mode configurations for a physical channel, according to various embodiments.

FIG. 4 illustrates transmission mode configurations for a physical channel, according to various embodiments.

The present teachings support placing a physical channel in single user (SU) or multiple user (MU) transmission mode. A physical channel may be dynamically placed in SU or MU transmission modes. A hybrid transmission mode intermittently changes the transmission mode between MU and SU modes. For hybrid use bands (SU and MU in the same band), switching between the two modes may be TDMA based. In FIG. 4, band F4 is assigned SU mode for SU transmissions, band F1 is assigned MU mode for MU transmissions, and bands F2 and F3 are for a hybrid usage where the transmission mode is switch between SU and MU according to a time plan. As such, flexible hybrid and fixed mode configurations may be provided for a frequency resource.

A SU UT may operate as contention-free device. Contention free transmission may be provided by a grant frequency and/or timeslot protocol, for example, the existing frequency and timeslot protocol providing an uplink or downlink map on the forward channel. To operate with the grant protocol, the SU UT may include a receiver in some embodiments. To avoid collisions over the SU channel, a SU UT requests bandwidth allocation prior to transmitting.

In the single user mode, a FER≤0.1% at [−6] dB may be attained in AWGN. In the Multi-user mode, a FER≤1% at [−6] dB may be obtained in AWGN. In SU mode, a transmission repetition may be used to improve a link margin. For example, L transmissions of a message may lead to an increased SNR at the receiver: SNR→L×SNR. In contrast, in practical MU mode implementations, L transmissions of a message do not lead to an L×SNR improvement at the receiver. However, in the MU mode, L transmissions do improve the probability of a successful reception, for example, from: $P_e \rightarrow P_e^L$.

Multiuser Receiver RAN High Level Signal Processing

Figure 5:
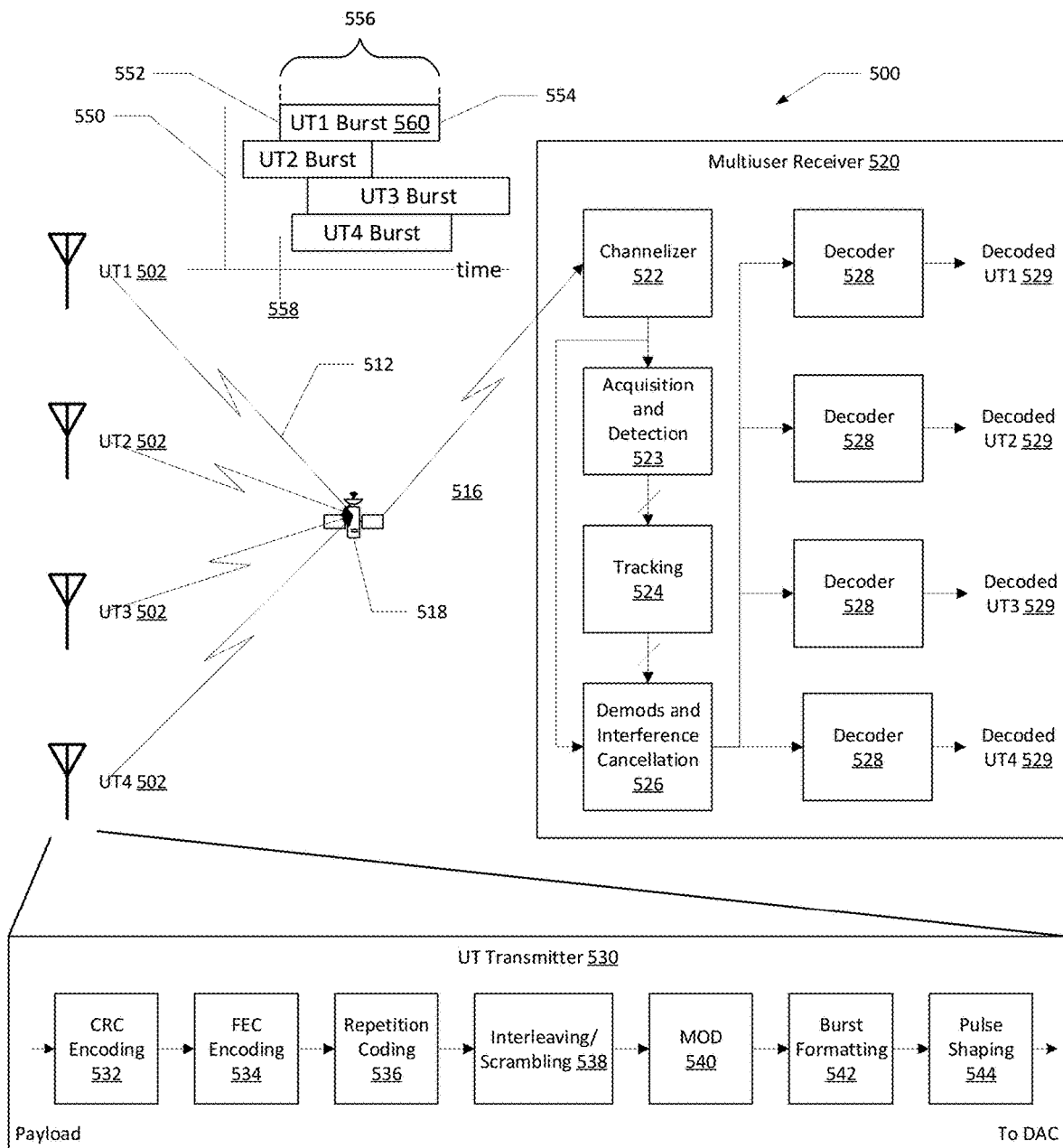
FIG. 5 illustrates a multiuser receiver according to various embodiments.

FIG. 5 illustrates a multiuser receiver according to various embodiments.

FIG. 5 illustrates a satellite network 500 including UTs 502, a satellite 518 and a multiuser receiver 520. The UTs 502 may transmit a burst 560 on a physical channel 512—here UT1, UT2, UT3 and UT4 transmit on the physical channel 512. The bursts 560 may be received by the satellite 518. The satellite 518 may forward a composite signal 516 including all the bursts 560 (without any realignment) to the multiuser receiver 520. A timeslot duration 556 of each the bursts 560 need not be same.

In MU transmission mode, more than one of the UTs 502 may be transmitting on the physical channel 512 at an instant. In MU transmission mode, the UTs 502 may transmit bursts 560 asynchronously as illustrated by chart 550. In MU transmission mode, the UTs 502 may transmit a burst 560 without regard to a frame boundary 558. In MU transmission mode, a start instant 552 of the bursts 560 need not be the same. In MU transmission mode, an end instant 554 of the bursts 560 need not be the same.

In SU transmission mode, a timeslot grant may be obtained prior to transmission of the burst 560 by the UT 502. In SU transmission mode, the timeslot grant may be synchronized with the frame boundary 558. In SU transmission, bursts 560 from the UTs 502 do not overlap in time, ever partially (not shown).

The multiuser receiver 520 may be disposed at a gateway for receive processing. In some embodiments, the multiuser receiver 520 may process the signals per the physical channel 512. The multiuser receiver 520 may include a channelizer 522, an acquisition and detection module 523, a tracking module 524, an demodulators and interference cancellation module 526, and decoders 528.

The composite signal 516 may be provided to the channelizer 522 to select a channel of interest from the composite signal 516. The channel or matched filter output of the channelizer 522 may be provided to the acquisition and detection module 523 to perform Unique Word (UW) based correlation and detection. In some embodiments, when iterative acquisition is used, outputs 529 of decoders 528 may be used the acquisition and detection module 523. The acquisition and detection module 523 outputs a count of detected users, coarse timing, frequency, and a Signal to Noise Ratio (SNR) for each user.

The channel or matched filter output from the channelizer 522 and the output of the acquisition and detection module 523 may be provided to the tracking module 524 to perform finer timing, frequency estimation, phase estimation and SNR for each user. In some embodiments, outputs 529 of all the decoders 528 may be provided to the tracking module 524. The tracking module 524 may output refined timing, frequency, phase, SNR, sync error compensated I&Q stream for each user.

The channel or matched filter output from the channelizer 522 and the output of the tracking module 524 may be provided to the demodulators and interference cancellation module 526 to provide interference cancellation and soft output generation for each use. In some embodiments, outputs 529 of all the decoders 528 may be provided to the demodulators and interference cancellation module 526. The output of the demodulators and interference cancellation module 526 is a soft input to the decoders 528.

The soft output from the interference cancellation module 526 may be provided to the decoders 528. The outputs 529 of the decoders 528 are decoded bursts including the burst payload. There may an independent decoder for each user and extrinsic information generation for each user. In some embodiments, a user specific scrambling/interleaving module (not shown) may be disposed between interference cancellation module 526 and the decoders 528. The decoders may be Single-In Single-Out (SISO) or the like decoders.

Each UT 502 may include a UT transmitter 530. The UT transmitter 530 may include a CRC encoding module 532, an FEC encoding module 534, a repetition coding module 536, an interleaving/scrambling module 538, a modulator module 540, a burst formatting module 542 and a pulse shaping module 544. The UT transmitter 530 may receive a payload as an input and generate an output to be processed by a Digital to Analog Converter (DAC) prior to transmission. Each UT 502 may include a power module (not shown) to place the UT 502 in a connected mode, an idle mode, or a power saving mode.

A multi-user receiver differs from a conventional TDMA receiver as the receiver must detect, demodulate, and decode bursts received from multiple users sharing a same time and frequency resource. The receiver may be configured is contention based or contention free. in a Contention based configuration, the receiver operates similar to an existing RACH receiver except for MU detections. In contention-based configuration, the UT may operate as a Grant free Terminal, where the transmission is based on a timer, a backlog, ability of the receiver to detect multiple transmissions and separate them. The Contention free configuration may be the same as an existing uplink grant based packet data channel. The configuration can be selected per a physical channel/timeslot basis as illustrated in FIG. 4.

The receiver may be robust enough to provide a required Quality of Service (QoS). For example, the receiver may be configured for a dedicated user. However, there may be an unintended signal collision due to other user transmission. Such an event may be due to an error in the downlink reception or other practical scheduling related error scenarios.

Terminal Power Saving

In the prior art, for example, the GMR-1 3G standard, a UT may be in an idle mode or a connected mode. Furthermore, a Dormant Power ($P_D$) for the UT is less than a Transmit Power ($P_T$) or a Receive Power ($P_R$) consumed by the UT for an interval. In idle mode, the UT consumes $P_R$, $P_T$ and $P_D$ in various intervals. In the connected mode of the prior art, the UT consumes $P_R$ and $P_T$ in various intervals; when not transmitting the UT defaults to $P_R$ (not $P_D$).

Figures 6, 7:
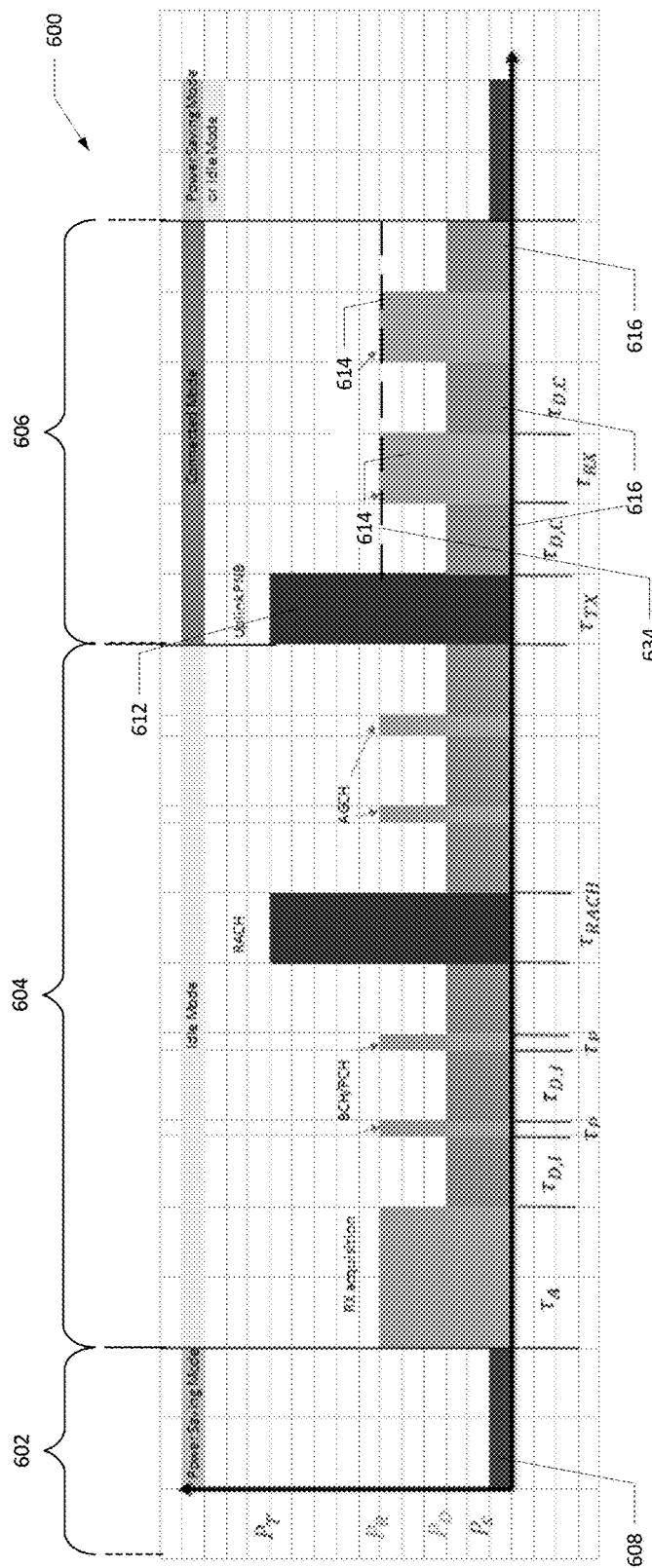
FIG. 6 illustrates an exemplary time and power diagram of a UT according to various embodiments.
FIG. 7 illustrates an exemplary enhanced power mode with an aggressive duty cycling according to various embodiments.

FIG. 6 illustrates an exemplary time and power diagram of a UT according to various embodiments.

The present teachings disclose a power plan 600 including a power saving mode 602, an idle mode 604 and a connected mode 606. The power plan 600 may be implemented by a power module in a UT. In the power saving mode 602, the UT consumes a Deep Sleep Power ($P_S$) 608. $P_S$ 608 is less than a $P_D$ 616. In some embodiments, a direct transition from a connected mode 606 to the power saving mode 602 without going through an idle mode 604 is provided.

In some embodiments, the idle mode 604 remains unchanged from the prior art.

In some embodiments, the connected mode 606 is enabled for an interval. In the connected mode, a UT consumes $P_T$ 612 for a transmitting duration $T_{TX}$, $P_R$ 614 for a receiving duration $T_{RX}$, and $P_D$ 616 for a dormant duration $T_{D,C}$. The use of $P_D$ 616 is made feasible with a DLMAP and/or a ULMAP. With a DL-MAP, the UT can determine what timeslot is assigned to it to receive information from a gateway. Thus, the UT can save power by selectively demodulating/decoding only the assigned timeslots. As such, a UT need only consume $P_D$ 616 during unassigned timeslots in the connected mode 606. In contrast, the prior art consumes $P_R$ 634 during the unassigned timeslots; $P_S$ 608 is less than a $P_D$ 616. In some embodiments, a first and/or a second PNB may carry a DLMAP, a ULMAP, or system information in addition to user/control data or an uplink acknowledgement.

FIG. 7 illustrates an exemplary enhanced power mode with an aggressive duty cycling according to various embodiments.

Assuming that a UT is configured to receive every hour (3600 seconds) with a 10 second window to receive data. As such, the UT wakes us every 3590 seconds for a 10 second window in 3600 second intervals. Table 700 compares power consumption by a UT utilizing deep sleep with a UT without deep sleep. For total usage in a day, significant energy saving (greater than 48×) by using smart power utilization including deep sleep power consumption for 3590 seconds every 3600 seconds are obtained. For example, battery life of a UT powered with two AA batteries (5 Wh) may be increased to 1.1 years when deep sleep is utilized rather than only 8.2 days for a UT without deep sleep.

Sat NB-IoT Payload Optimization

Figure 8:
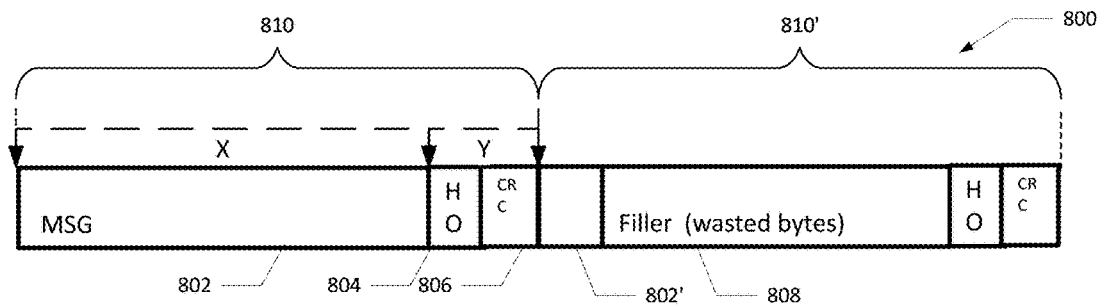
FIG. 8 illustrates a message according to various embodiments.

FIG. 8 illustrates a signal according to various embodiments.

A signal 800 may include a burst 810 that conveys a MSG portion 802 of X bytes. The burst 810 may include a HO portion 804 (header overhead) and a CRC portion 806 having a size of Y bytes (together referred as HO+CRC). The payload of the burst 810 is X+Y bytes. When a message size of the message is larger than X, the message may be transmitted over multiple bursts 810, 810'. When mod (message size,X) is non-zero, the remainder mod(message size,X) bytes of the message may be transmitted in the burst 810' including mod(message size,X) bytes 802' and filler bytes 808. The burst 810' may be used when a message size is smaller than X or mod (MSG,X) is non-zero. The burst 810 may be used when the message size is greater than or equal to X.

Figure 9:
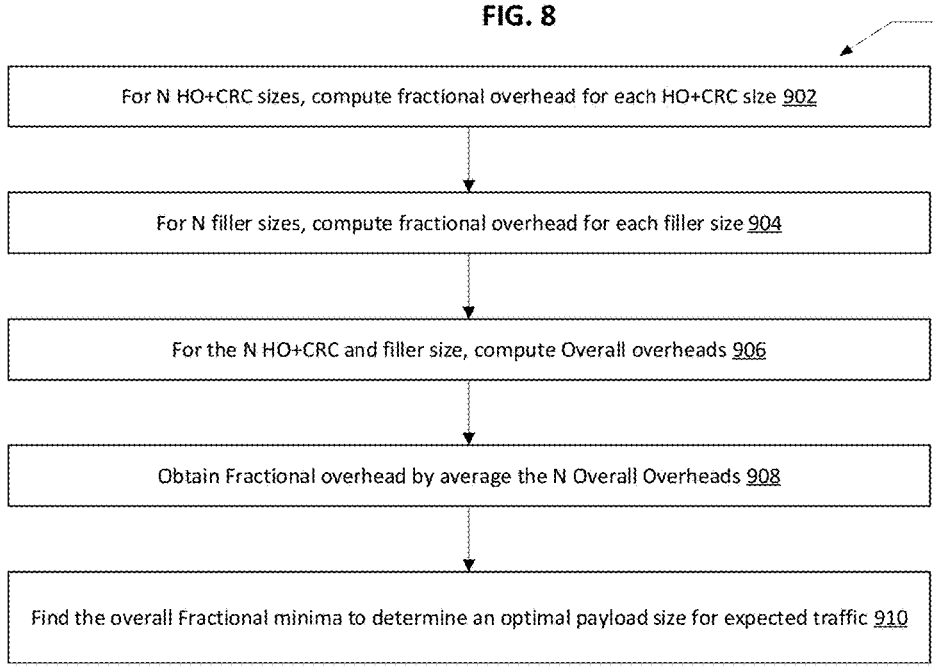
FIG. 9 illustrates a method for determining an optimum payload size to minimize the overhead utilization while maximizing a burst utilization for payload delivery according to various embodiments.

The MSG size (bytes) can be modeled as a random variable. The 3GPP IoT Traffic Model (MAR periodic reports) Truncated Pareto Distribution provides that IoT traffic generally has the following characteristics:

Min: 20 bytes
Max: 200 bytes
Average≅33 bytes
Standard Deviation≅21 bytes
90 percentiles≅50 bytes FIG. 9 illustrates a method for determining an optimum payload size to minimize the overhead utilization while maximizing a burst utilization for payload delivery according to various embodiments.

Figure 10A:
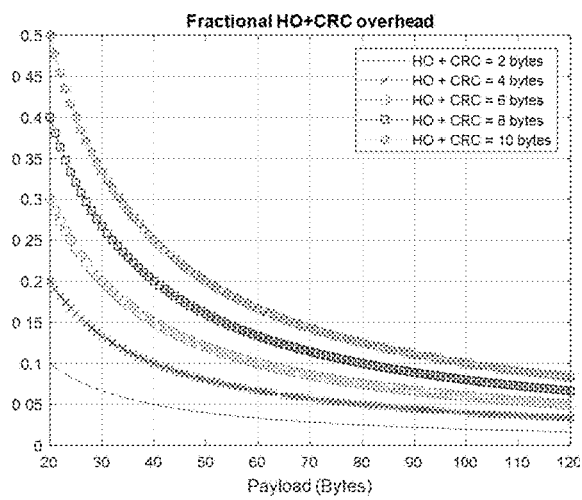
FIG. 10A illustrates fractional overheads for various HO+CRC sizes according to various embodiments.

FIG. 10A illustrates fractional overheads for various HO+CRC sizes according to various embodiments.

Figure 10B:
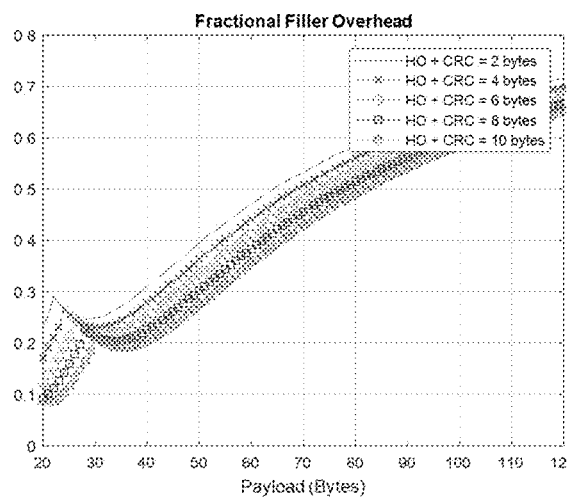
FIG. 10B illustrates fractional overheads for various filler sizes according to various embodiments.

FIG. 10B illustrates fractional overheads for various filler sizes according to various embodiments.

FIG. 10C illustrates fractional overheads for various HO+CRC and filler sizes according to various embodiments.

FIG. 10D illustrates an overall fractional overhead according to various embodiments.

FIG. 9 illustrates a method 900 to determine an optimum payload size to minimize the overhead utilization while maximizing a burst utilization for payload delivery. The method 900 includes an operation 902 that, for N HO+CRC sizes, computes a fractional overhead for each HO+CRC size (for example, as illustrated in FIG. 10A). The method 900 includes an operation 904 that, for N HO+CRC sizes, computes a fractional overhead for each filler size (for example, as illustrated in FIG. 10B). The method 900 includes an operation 906 that, for N HO+CRC and filler sizes, computes overall fractional overheads for each (for example, as illustrated in FIG. 10C). The N overall fractional overheads for operation 906 may be computed by, for example, adding the N fractional overheads of operation 902 with N fractional overheads of operation 904. The method 900 includes an operation 908 that computes an overall fractional overhead by averaging the N overall fractional overheads of operation 908 (for example, as illustrated in FIG. 10D). The method 900 includes an operation 910 that finds the overall fractional minima to determine an optimal payload size for an expected traffic. The overall fractional minima are illustrated as ellipse 1002 in FIG. 10D.

FIG. 11 illustrates a method for communicating with an IoT device via a satellite link according to various embodiments.

A method 1100 for communicating with an IoT device via a satellite link may include an operation 1102 to assign a transmission mode to a physical channel, wherein the physical channel supports bursts of multiple timeslot durations and the transmission mode is selected from SU or MU. The method 1100 may include operation 1104 to calculate an optimal payload size based on optimizing a burst utilization. The method 1100 may include operation 1106 to select a timeslot duration from the multiple timeslot durations for a payload The method 1100 may include operation 1108 to segment the payload, prior to the transmitting, based on the optimal payload size. The method 1100 may include operation 1110 to obtain, when the transmission mode is SU, a timeslot grant for use of the physical channel for the timeslot duration. The method 1100 may include operation 1112 to transmit a burst including the payload, wherein the burst is transmitted synchronized with the timeslot grant when the transmission mode is SU and the burst is transmitted without synchronization when the transmission mode is MU. The method 1100 may include operation 1114 to receive the burst. The method 1100 may include operation 1116 to place the IoT device in a connected mode, an idle mode, or a power saving mode, wherein a power consumption rate of the power saving mode is less than both a power consumption rate of the idle mode and a power consumption rate of the connected mode.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A method for communicating with an Internet of Things (IoT) device via a satellite link, the method comprising:
   assigning a transmission mode to a physical channel, wherein the physical channel supports multiple timeslot durations and the transmission mode is selected from a single user (SU) or a multi-user (MU);
   selecting a timeslot duration from the multiple timeslot durations for a payload;
   obtaining, when the transmission mode is SU, a timeslot grant for use of the physical channel for the timeslot duration; and
   transmitting a burst comprising the payload, wherein the burst is transmitted synchronized with the timeslot grant when the transmission mode is SU and the burst is transmitted without synchronization when the transmission mode is MU.

2. The method of claim 1, wherein the transmitting uses an instantaneous Effective Isotropically Radiated Power (EIRP) that is less than −3.5 dBW for closing a link on the physical channel with a receiver.

3. The method of claim 1, wherein the physical channel supports multiple symbol rates and each of the multiple symbol rates has a low peak to average power ratio (PAPR).

4. The method of claim 1, further comprising calculating an optimal payload size based on optimizing a burst utilization; and segmenting the payload, prior to the transmitting, based on the optimal payload size.

5. The method of claim 1, further comprising placing the IoT device in a connected mode, an idle mode, or a power saving mode, wherein a power consumption rate of the power saving mode is less than both a power consumption rate of the idle mode and a power consumption rate of the connected mode.

6. The method of claim 5, wherein the connected mode comprises a transmitting duration consuming a transmitting power, a receiving duration consuming a receiving power and a dormant duration consuming a dormant power, wherein the dormant power is less than both the transmitting power and the receiving power.

7. The method of claim 1, further comprising receiving, with a multiuser receiver, the burst when the transmission mode is MU.

8. The method of claim 1, further comprising receiving, wherein the transmitting comprising repeating a burst, the receiving performs selection combining on the repeated bursts when the transmission mode is MU, and the receiving performs Maximum-Ratio Combining (MRC) on the repeated bursts when the transmission mode is SU.

9. The method of claim 1, further comprising aggregating a plurality of basebands to define the baseband of the physical channel.

10. The method of claim 1, further comprising dividing a baseband of the physical channel into sub-bands, wherein the transmission mode of each of the sub-bands is set independently.

11. A system to communicate with an Internet of Things (IoT) device via a satellite link, the system comprising:
   a physical channel that is assigned a transmission mode, wherein the physical channel supports multiple timeslot durations and the transmission mode is selected from a single user (SU) or a multi-user (MU); and
   a transmitter:
      to select a timeslot duration from the multiple timeslot durations for a payload,
      to obtain, when the transmission mode is SU, a timeslot grant for use of the physical channel for the timeslot duration, and
      to transmit a burst comprising the payload, wherein the burst is transmitted synchronized with the timeslot grant when the transmission mode is SU and the burst is transmitted without synchronization when the transmission mode is MU.

12. The system of claim 11, wherein the transmitter uses an instantaneous Effective Isotropically Radiated Power (EIRP) that is less than −3.5 dBW for closing a link on the physical channel with a receiver.

13. The system of claim 11, wherein the physical channel supports multiple symbol rates and each of the multiple symbol rates has a low peak to average power ratio (PAPR).

14. The system of claim 11, wherein the transmitter calculates an optimal payload size based on optimizing a burst utilization; and segments the payload, prior to the transmit, based on the optimal payload size.

15. The system of claim 11, further comprising a power module to place the IoT device in a connected mode, an idle mode, or a power saving mode, wherein a power consumption rate of the power saving mode is less than both a power consumption rate of the idle mode and a power consumption rate of the connected mode.

16. The system of claim 15, wherein the connected mode comprises a transmitting duration consuming a transmitting power, a receiving duration consuming a receiving power and a dormant duration consuming a dormant power, wherein the dormant power is less than both the transmitting power and the receiving power.

17. The system of claim 11, further comprising a multiuser receiver to receive the burst when the transmission mode is MU.

18. The system of claim 11, further comprising a receiver, wherein the transmitting comprising repeating the burst, the receiver performs selection combining on the repeated bursts when the transmission mode is MU, and the receiver performs Maximum-Ratio Combining (MRC) on the repeated bursts when the transmission mode is SU.

19. The system of claim 11, wherein the transmitter aggregates a plurality of basebands to define the baseband of the physical channel.

20. The system of claim 11, wherein the transmitter divides a baseband of the physical channel into sub-bands, wherein the transmission mode of each of the sub-bands is set independently.

* * * * *